2,441,499

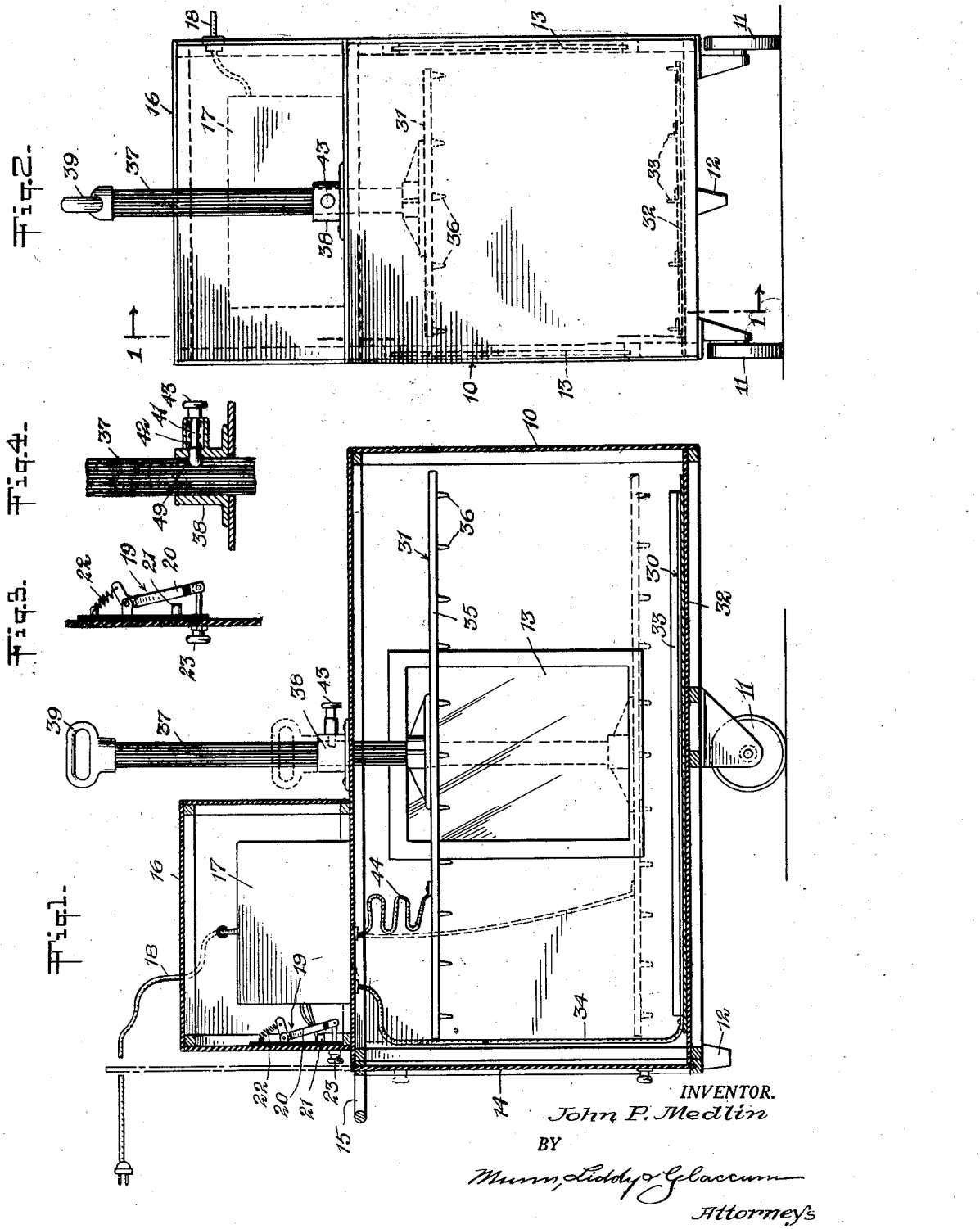
May 11, 1948.  J. P. MEDLIN  2,441,499
ELECTROCUTION CHAMBER FOR ANIMALS
Filed Nov. 10, 1944  2 Sheets-Sheet 1
INVENTOR.
John P. Medlin
BY
Munn, Liddy & Glaccum
Attorneys May 11, 1948.　　　J. P. MEDLIN　　　2,441,499
ELECTROCUTION CHAMBER FOR ANIMALS
Filed Nov. 10, 1944　　2 Sheets-Sheet 2
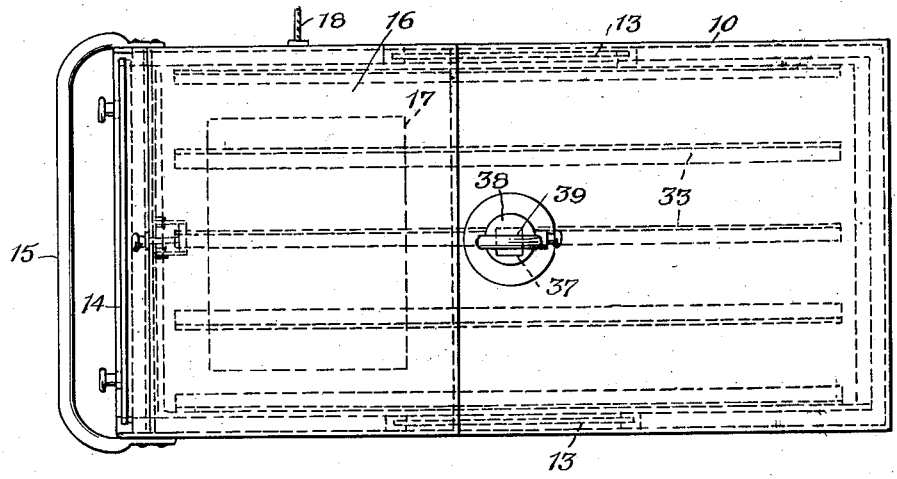
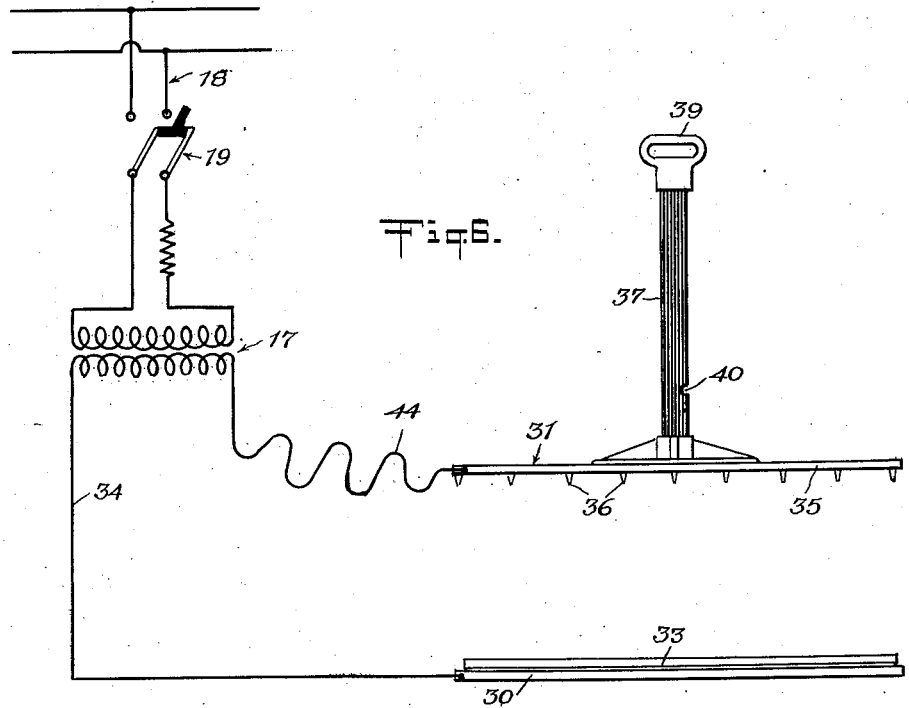
INVENTOR.
John P. Medlin
BY
Munn, Liddy & Glaccum
Attorneys Patented May 11, 1948

UNITED STATES PATENT OFFICE 2,441,499

ELECTROCUTION CHAMBER FOR ANIMALS

John P. Medlin, Great Falls, Mont.

Application November 10, 1944, Serial No. 562,869

2 Claims. (Cl. 17—1)

This invention relates to a humane device for disposing of stray or diseased animals such as dogs and cats which must be destroyed to protect the health and safety of organized communities.

The problem of how to dispose of such animals has never been very satisfactorily solved. Drowning, shooting and asphyxiation with lethal gases are commonly used, but they are cruel and inhuman and also somewhat dangerous to the operator, particularly in the case of the lethal gas method. Electrocution by a sufficiently high voltage to cause instant death is believed to be the most humane way of disposing of these animals but its use has been limited and restricted because of the inherent great danger to the operators.

The principal object of this invention is to provide a means for the humane electrocution of small animals with no risk to the operator and at low cost.

A further object is to provide an electrocution chamber for the humane electrocution of small animals which may be transported from place to place with great ease and which may be energized by means of the standard 115/120 volt alternating current.

Another object is the provision of an electrocution device of the character described which provides contact with the skin of the animal as distinguished from the hair or fur, thus providing the necessary contact for sending an electric current through the body of the animal, sufficient to cause instant death.

These and other objects are attained by mechanism shown in the accompanying drawing in which—

Fig. 1 is a vertical longitudinal section of the entire device on the line 1—1 of Fig. 2;

Fig. 2 is an end view of the device;

Fig. 3 is a detailed view of the safety switch of the device;

Fig. 4 is a detailed view of the pin mechanism which prevents downward movement of the upper electrode of the device when such movement is not desired;

Fig. 5 is a plan view of the device as a whole; and

Fig. 6 is a diagrammatic view of the electric circuit of the device showing it connected up with the upper and lower electrodes thereof.

The electrocution device shown in the drawing is provided with an insulated chamber 10 mounted on a pair of wheels 11 and a rest 12. Set into the sides of the chamber are glass windows 13 and mounted at the front end of the chamber is vertically slidable, non-removable door 14. The chamber is equipped with a handle 15 to facilitate its transportation from place to place.

On top of the chamber 10 and at the front end thereof, is a secondary chamber 16 which is also insulated. This chamber houses the transformer 17 which may be of the 1000 watt 115 to 2200 volt dry type. The transformer is provided with an electric cord 18 which has a standard plug for plugging into any 115/120 volt alternating current appliance receptacle.

The transformer is controlled by switch 19 which is mounted on the inner front wall of the secondary chamber. The switch comprises a bell crank 20 which serves as one contact point and a terminal 21 which serves as the other contact point. A relatively strong tension spring 22 normally holds the bell crank out of contact with the terminal. Axially slidable handle 23 brings the bell crank into contact with the terminal against the action of the spring. It will be noted that a strong, deliberate pull on the handle is necessary to close the circuit and that when the handle is released the circuit is automatically broken. It will also be noted that the line of movement of the handle intersects the path of movement of the door. When the door is raised to open the electrocution chamber, the switch handle cannot be pulled out to close the circuit. If the handle is pulled out prior to opening the door and the handle is held in that position, the door cannot be opened.

The chamber 10 is provided with one lower fixed electrode 30 and one upper vertically movable electrode 31. The lower electrode comprises a horizontally disposed metal plate 32 of high electrical conductivity affixed to the floor of the chamber and a series of parallel angle bars 33 also of high conductivity affixed to the upper surface of said plate 32. An electric wire 34 connects said electrode with the transformer.

The upper electrode 31 comprises a horizontally disposed plate 35 of high electrical conductivity having prongs 36 affixed to its lower surface, the prongs being also made of material that conducts electric current well. A vertically disposed shaft 37 made of material that does not conduct electricity is slidably disposed in bearing 38 which is affixed to the upper wall of chamber 10. Movable electrode 31 is affixed to its lower end and handle 39 to its upper end. Handle 39 serves two functions: it is used to raise the movable electrode and it also serves to prevent said electrode from contacting the fixed electrode. It will be seen in Fig. 1 that the handle is stopped by the bearing before the movable electrode reaches the fixed electrode. Shaft 37 has a notch 49 in its side adapted to accommodate a horizontally movable pin 41 which tends, under the tension of torsion spring 42, to move in the direction of shaft 37 and hence into notch 49 when in registration therewith. A handle 43 at the end of said pin is used to pull said pin out of the notch. A flexible electric wire 44 connects said upper electrode 31 with the transformer.

When it is desired to operate the device, the transformer is connected to any standard electrical outlet, the movable electrode 31 is raised until pin 41 enters notch 49, the door 14 is opened, and the animal is brought into the chamber 10. The door 14 is now lowered thereby closing the chamber. The pin is drawn out of the notch thereby enabling electrode 31 to descend of its own weight. The weight of said electrode is not very considerable since said electrode is intended to be made of relatively light materials in order to cause the animal no great discomfort when it reaches the animal and rests upon it. Prongs 36 will penetrate the hair or fur of the animal and painlessly contact its skin. At the same time, the feet of the animal will be in contact with fixed electrode 30. Angle bars 33 will here and there also penetrate the hair or fur of the animal and will contact its skin. The apparatus is now ready for the final act. The switch 49 is closed and electrocution takes place.

Variations in the device as described may be had without departing from the principles of the invention. Thus, in place of handle 15, a trailer coupling may be substituted for attaching the device to an automobile. In place of angle bars 33 on the fixed electrode, pronged members or grates may be substituted. These members may be provided with any suitable shape so long as they have a plurality of relatively sharp projections or edges—sharp enough to penetrate the hair of the animal yet dull enough to avoid puncturing the skin.

I claim:

1. An electrocution device for animals comprising an insulated chamber containing a fixed lower electrode and a vertically movable upper electrode, means supplying high voltage current to said electrodes, a manually operated switch which is normally held open under spring tension controlling said current supplying means, and a non-removable, sliding door in one of the walls of said chamber, said switch having a handle whose line of movement intersects the path of movement of the door, said handle being inaccessible when the door is in raised position.

2. An electrocution device for animals comprising an insulated chamber containing a fixed lower electrode and a vertically movable upper electrode, and means supplying high voltage current to said electrodes, the upper electrode being mounted on the lower end of a vertically movable insulated shaft which is carried by a bearing on the chamber, a handle at the upper end of said shaft which engages the bearing on downward movement of the upper electrode before the latter contacts the lower electrode, and tensioned means for holding said shaft in raised position.

JOHN P. MEDLIN.

REFERENCES CITED

The following references are of record in the file of this patent:

UNITED STATES PATENTS

| Number | Name | Date |
|---|---|---|
| 577,233 | Burger | Feb. 16, 1897 |
| 1,075,386 | Smith | Oct. 14, 1913 |
| 1,689,448 | Moynahan | Oct. 30, 1928 |
| 1,935,138 | Windisch | Nov. 14, 1933 |
| 2,361,970 | Schmitt | Nov. 7, 1944 |
| 2,411,766 | Vincent et al. | Nov. 26, 1946 |

FOREIGN PATENTS

| Number | Country | Date |
|---|---|---|
| 469,647 | Great Britain | July 29, 1937 |
| 202,091 | Germany | Sept. 24, 1908 |